Jan. 1, 1935.   H. R. SCHUTZ   1,986,449
METHOD AND APPARATUS FOR FEEDING GLASS BLANKS TO PRESSING MACHINES
Filed Feb. 17, 1933    6 Sheets—Sheet 1

Patented Jan. 1, 1935

1,986,449

UNITED STATES PATENT OFFICE 1,986,449

METHOD AND APPARATUS FOR FEEDING GLASS BLANKS TO PRESSING MACHINES

Harold R. Schutz, Ottawa Hills, Ohio, assignor to The Libbey Glass Manufacturing Company, Toledo, Ohio, a corporation of Ohio Application February 17, 1933, Serial No. 657,214

14 Claims. (Cl. 49—5)

This invention relates to a new and improved method and apparatus for feeding glass blanks to pressing machines, and more particularly to an improved mechanism which is almost completely automatic for carrying out this improved feeding and pressing process.

In one of the simplest methods of pressing glass articles, a mass of molten glass is gathered on a punty, and a portion of this suspended glass is cut off and permitted to drop into the lower section of a pressing mold. The upper mold section or movable pressing device is then forced downwardly onto this glass blank so as to press the article to shape. Numerous automatically operated mechanisms have been proposed for mechanically feeding these glass blanks to the pressing molds. The present invention relates to an improved process and apparatus for feeding these glass blanks to the pressing molds and performing the pressing operation.

In a now well-known type of glass blowing machine, a gathering ram projects an inverted gathering mold into a glass furnace above a pool of molten glass and sucks a charge of glass into the mold. The mold is lifted and withdrawn from the furnace, the surplus glass being cut off from the lower end of the charge and dropped back into the pool. This glass blank is then dropped onto the upper end of a spindle which is rotatable about its longitudinal axis and which may be inverted end for end. The spindle is provided with means for gripping the supported end of the blank and for expanding or blowing the blank to the desired form. After the spindle and blank are inverted so that the blank is suspended from the lower end of the spindle, the blank is enclosed in a blowing mold which gives the blank the desired form when expanded. It has been proposed to utilize a gathering ram and gathering mold of this type in a pressing machine, the gathered and cut-off blank being dropped directly from the gathering mold into the pressing mold. Such an apparatus is disclosed and claimed in the patent to August Kadow, No. 1,264,085 granted April 23, 1918. Such a process is not entirely successful, since the lower end portion of the glass blank is scarred and chilled by the cut-off knife or shears, and when this blank is dropped from the gathering mold, the scarred portion will come into direct contact with the pressing mold and will not be obliterated during the succeeding pressing operation. In the simpler pressing process first described, where the glass blank is cut off from a mass suspended from a punty, the cut-off scar is on the upper end of the blank and does not contact with the pressing mold, and this scarred portion is obliterated by the pressing device which subsequently comes down onto the blank.

According to the present invention, a spindle mechanism similar to that utilized in the blowing machine described above is employed to invert the blank before it is dropped into the pressing mold so that the cut-off scar will be uppermost, as in the first described punty process. More specifically, substantially the same steps followed in the blowing machine process are carried out until the glass blank is suspended from the lower end of the rotating spindle, although the glass blank is not blown or expanded except for the elongation that will be caused by the action of gravity on the suspended molten blank. Preferably the inverted blank is reheated and a "necking in" device is applied to the blank directly beneath the spindle to substantially reduce the diameter of the upper portion of the blank, and a pair of shears are then utilized to automatically cut off the suspended blank so that the cut off portion will fall into the pressing mold. The mold is then moved from beneath the spindle into position beneath the pressing device or movable upper mold section which is forced downwardly to press the article to shape. While the mold is removed from beneath the spindle, the spindle jaws are opened to eject the upper portion of the blank or moil which is returned to the furnace as cullet.

The principal object of this invention is to provide an improved process and apparatus for pressing glass articles as briefly described hereinabove and set forth more in detail in the specifications which follow.

Another object is to provide an improved process for feeding glass charges to a pressing machine.

Another object is to provide an improved mechanism for feeding glass blanks to a pressing machine.

Another object is to provide improved means for shaping and cutting off the glass blanks.

Another object is to provide improved means for ejecting the finished articles from the molds.

Another object is to provide a continuously operating and completely automatic machine for feeding and pressing molten glass.

Other objects and advantages of this invention will be more apparent from the following detailed description of one approved form of apparatus suitable for carrying out this improved process,

In the accompanying drawings:

Fig. 1 is a central vertical section through the principal elements of a machine designed to automatically carry out this improved feeding and pressing operation.

Briefly described the apparatus comprises a furnace A from which the molten glass is obtained, and a pair of gathering molds B carried by a gathering ram C which is adapted to project the molds B into the furnace to gather charges of molten glass. The forming machine comprises a central fixed frame portion D on which is rotatable an annular frame structure or carriage E carrying a plurality of pairs of spindles F positioned at spaced intervals about the circumference of the rotary frame. Pairs of pressing devices G are positioned on frame E between each pair of spindles F, and pairs of pressing molds H are movable back and forth on frame E between alternative positions beneath the spindles F and pressing devices G. The ejecting mechanism J is adapted to remove the finished pressed articles from the molds H. A "necking-in" mechanism K and a cut-off mechanism L is associated with each pair of spindles F. The supporting frame E is slowly but continuously rotated upon the fixed frame D, and many of the movements of the several mechanisms carried by frame E are caused to take place at certain angular positions of the rotary frame E by cooperating cam devices carried respectively by the fixed and rotary frames D and E and indicated generally at M.

Before describing this apparatus in detail, the successive steps of this improved process will first be briefly explained by referring to Figs. 7 to 16 inclusive.

Figures 7, 8, 9, 10, 11, 12, 13, 14, 15, 16:
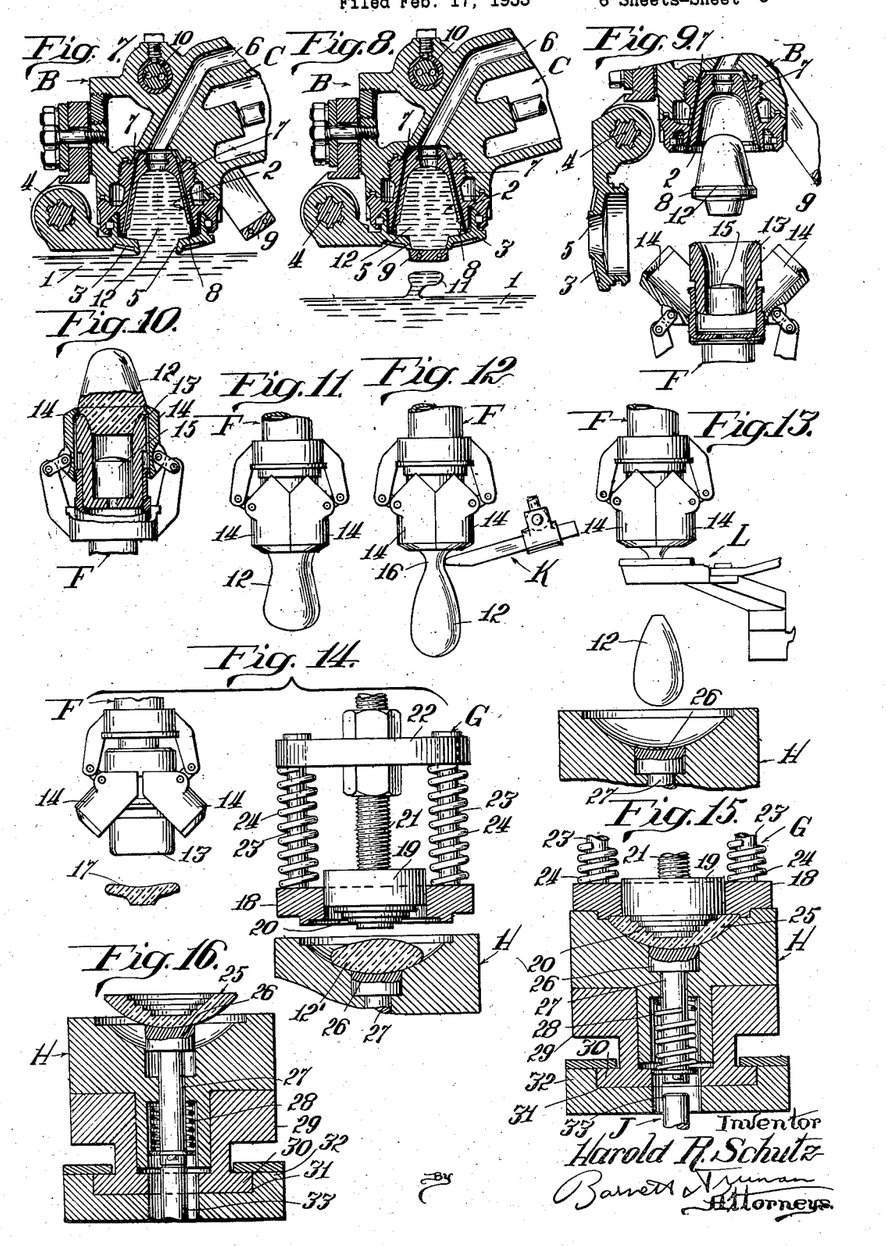
Figs. 7 to 16 inclusive are detail views, partially in vertical section and partially in elevation, illustrating successive steps in the process, and showing some portions of the mechanism for carrying out this process.

As shown in Fig. 7, one of the gathering molds B has been projected into the furnace in proximity to the surface of the pool 1 of molten glass. This mold comprises an inverted cup 2 which is partially closed at its lower end by a cover or neck mold 3 hinged to the mold assembly at 4 and provided with a central opening 5 through which the molten glass is drawn up into the mold. A passage 6 leading to the mold communicates with an exhausting mechanism or partially evacuated space so that suction may be applied to draw the charge of molten glass into the mold. Auxiliary suction passages 7 lead from the main passage 6 to the lower portion of mold cavity 2 so as to insure drawing the molten glass into the space above the closure 3 thus forming an annular rim 8 on the lower portion of the glass blank. As shown in Fig. 8, the mold has been lifted from pool 1 and partially withdrawn from the furnace and the knife or cut-off device 9, pivoted at 10, has been swung across the opening 5 at the bottom of the mold to shear off the excess glass 11 which falls back into the pool 1. As shown in Fig. 9, the mold has been completely withdrawn from the furnace and positioned above one of the spindles F. The closure 3 has been opened and the glass blank (indicated generally at 12) has been ejected from the mold by a puff of air applied through the passage 6. The spindle F is formed at one end with a cup 13 for receiving the lower portion of the blank 12, and is provided with a pair of jaws 14 which are clamped together over the rim or flange 8 of the blank as shown in Fig. 10 so as to securely hold the blank in place at the end of the spindle. A longitudinally movable plunger device indicated at 15 may be employed to partially eject the glass from the spindle. After the glass blank has been accepted by the spindle and clamped in position by jaws 14, the spindle is inverted end for end as indicated in Fig. 11 so that the blank 12 is now suspended from the lower end of the spindle. Preferably the spindle B is continuously rotated or oscillated about its longitudinal axis after the glass blank has been accepted so that a symmetrical form will be assumed by the suspended blank. In Fig. 12 the "necking-in" device K has been applied to the blank directly beneath the spindle B so that the main body of the blank is suspended by a reduced neck portion 16, and in Fig. 13 the necking-in tool K has been withdrawn and the neck 16 has been severed by the shears L so that the main portion of the blank 12 has been dropped into the pressing mold H. In the next step of the process, as illustrated in Fig. 14, the mold H has been shifted from its position beneath the spindle F to an alternative position beneath the pressing device G, the molten blank 12 having spread out to some such position as indicated at 12'. After mold H has been removed from its position beneath spindle B, the spindle jaws 14 are opened so as to release the remaining portion 17 of the original glass blank which is discarded and used as cullet. The cooperating pressing device G and mold H are adapted, in the example here illustrated, to press a lens, but it will be apparent that by changing the forms of these respective members different types of pressed articles can be formed. The pressing device G comprises an annular member 18 adapted to fit within and close the upper outer portion of mold H, and a central plunger 19 movable through the ring 18 and formed on its lower surface 20 to stamp out the inner portion of the lens. The plunger 19 is carried by the plunger-stem 21 on which is secured the crosshead 22 from which the ring 18 is movably supported by means of stems 23 slidably guided through the cross-head and surrounded by compression springs 24 confined between the cross-head 22 and ring 18. It will be apparent that as stem 21 is moved downwardly, the ring 18 will first be seated on the mold H, and the plunger 19 will then be forced downwardly to shape the lens as indicated at 25 in Fig. 15.

The ejecting mechanism J comprises a head 26 normally seated below the lower portion of the mold cavity as indicated in Figs. 13, 14 and 15, the head being carried at the upper end of a stem 27 normally held down by the spring 28 as indicated in Fig. 15. The mold H is mounted in a carrier 29 which has a flanged lower portion 30 slidable in a track or slideway 31 formed in the supporting frame 32. The mold and carrier 29 are shifted along this slideway from the position beneath spindle B to the position beneath pressing device G, and vice versa. After the lens 25, or similar article, has been pressed the mold H is shifted from its position beneath the pressing device G to a position over the vertically movable plunger 33 which is automatically projected upwardly by mechanism hereinafter described. This plunger 33 will engage the lower end of the stem or plunger 27, as indicated in Fig. 16, moving this plunger upwardly against the resistance of spring 28 and causing the head 26 to lift the lens 25 out of the mold.

Briefly reviewing the steps of this process, it will be noted that the steps illustrated in Figs. 10, 11, 12 and 13 could be omitted and the blank 12 as released from the mold B in Fig. 9 dropped directly into the mold H as shown at the lower portion of Fig. 13. This would be substantially in accordance with the process disclosed in the Kadow Patent No. 1,264,085, hereinabove referred to. However, it has been found that the first cut-off operation as performed by the knife 9 (see Fig. 8) chills the lower end of the original blank and forms a scar which is further chilled by contact with the pressing mold and is clearly visible in the finished article if this chilled and scarred portion of the blank is dropped directly into engagement with the mold H. There will also be a seam in the blank formed by the separation of the blank mold B and neck mold. According to the present improved process, this chilled end of the blank is dropped into the spindle F, the blank is afterwards inverted and the suspended blank again cut off adjacent its upper end. The resulting cut-off scar will not be as pronounced as before and will now be uppermost so that it will not contact with the pressing mold H and will be obliterated by reheating and the settling and pressing processes illustrated in Figs. 14 and 15. A certain portion of the original blank must be discarded, as indicated at 17 in Fig. 14, but since a certain proportion of cullet is required in the preparation of the original glass batch there is actually no waste on account of this rejected portion 17.

Referring now more particularly to Figs. 1 to 6 inclusive, the actual mechanism used will be more specifically disclosed. The furnace A may be of conventional type and is provided with a working opening 34 leading into the boot 35 which has portions 36 projecting downwardly beneath the surface of the molten pool 1 so as to partially segregate a portion of this glass pool from which the molds B suck the charges or blanks of glass. The projected position of the ram C and molds B is shown in dotted lines (Fig. 1), and the withdrawn or discharging positions of the ram and molds are shown in solid lines. The single ram C carries a pair of similar gathering molds B which are simultaneously operated to withdraw two glass blanks and feed these blanks to a pair of similar spindles F. Usually the frame or table E which carries the several spindle assemblies rotates continuously at a slow speed, the ram assembly C is pivotally mounted about the central vertical axis of the machine as indicated at 90 and means (not here specifically shown but now well-known in the art) is provided for causing the ram C to move with the frame E and spindles F through a small arc while the glass blanks are being discharged into the spindles, after which the ram returns to its original position. Each pair of spindles F is carried by a head 37 which may be oscillated through an arc of 180° about a horizontal axis by means including the cam-operated bell-crank lever 91 so as to invert the spindles end for end from the position shown at the right of Fig. 1 in which the glass blanks are received, to the position shown at the left of Fig. 1 in which the blanks are suspended from the lower ends of the spindles. Preferably means which may include the gear 92 meshing with stationary rack 93 is also provided whereby the spindles are continuously rotated about their longitudinal axes while the glass blanks are carried thereby so as to give a symmetrical form to the blanks. All of this mechanism is substantially the same as has heretofore been used in glass-blowing mechanisms of well known type, (for example as shown in the patent to Kadow et al., 1,555,216, granted September 29, 1925) means being provided for blowing air through the spindles F into the blanks so as to expand these blanks within blowing molds. In the present mechanism, all of the blowing mechanism may be dispensed with and consequently the spindles or equivalent blank-holding devices are considerably simplified. As in the blowing machines, means is provided for automatically opening and closing the spindle jaws 14 when the blanks are received and discharged therefrom.

The "necking-in" mechanism K comprises a pair of similar necking tools 38, one for each of the suspended blanks 12, these tools being carried by a cross-head 39 (see Figs. 2 and 3) mounted at the outer end of a slide 40 movable in a slideway 41 on rotary frame E. A lever 42 fulcrumed at its lower end 43 is connected by link 44 with the slide 40. The lever 42 is intermediately connected by link 45 with a second slide 46 movable in the fixed slideway 47 and carrying a roller 48 which engages in the cam slot 49 formed in an annular cam plate 50 carried by the fixed supporting frame D. The cam slot 49 is so formed that as the rotary mechanisms move through their annular path, the necking tools 38 will be projected into engagement with the suspended blanks 12 after the spindles have been inverted, will be gradually extended against these blanks to neck-in the upper portion thereof, and will then be withdrawn before the shears L are operated to cut-off the blanks.

A separate cut-off mechanism L (see Figs. 2, 3 and 4) is provided for each of the spindles, each of these mechanisms comprising a pair of similar shears or knives 51 carried by levers 52 pivoted on a common vertical axis 53 and connected through links 54 with the piston rod 55 of a fluid pressure cylinder 56. The valves for controlling the admission of fluid under pressure to the two cylinders 56 are controlled by a valve stem 57 connected with lever 58 carrying a roller 59 which engages a fixed cam 60 carried by the fixed framework E. At the proper time fluid under pressure will be admitted to the cylinders 56 so as to cause the shears 51 to be operated to sever the necked-in portion 16 of the blank and permit the main lower portion thereof to drop into the pressing mold H, as shown in Fig. 13.

Figure 2:
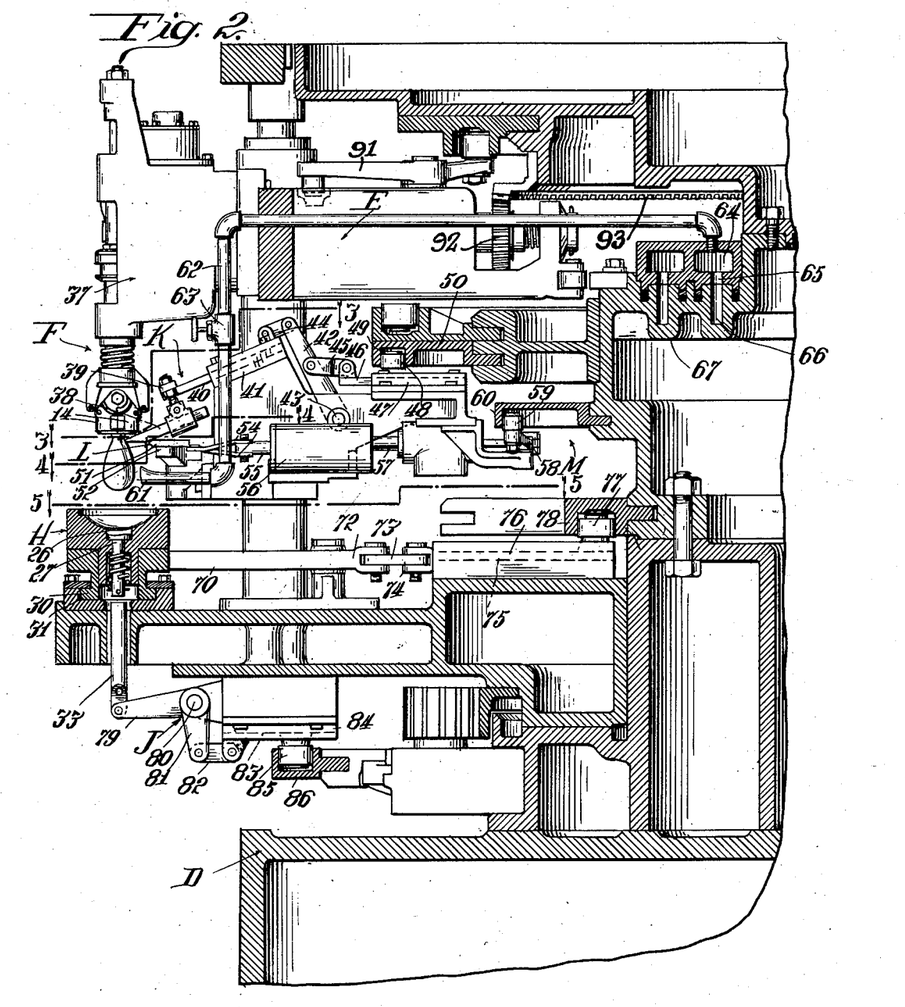
Fig. 2 is a partial vertical section on a larger scale, corresponding to the left-hand portion of Fig. 1.
Figure 6:
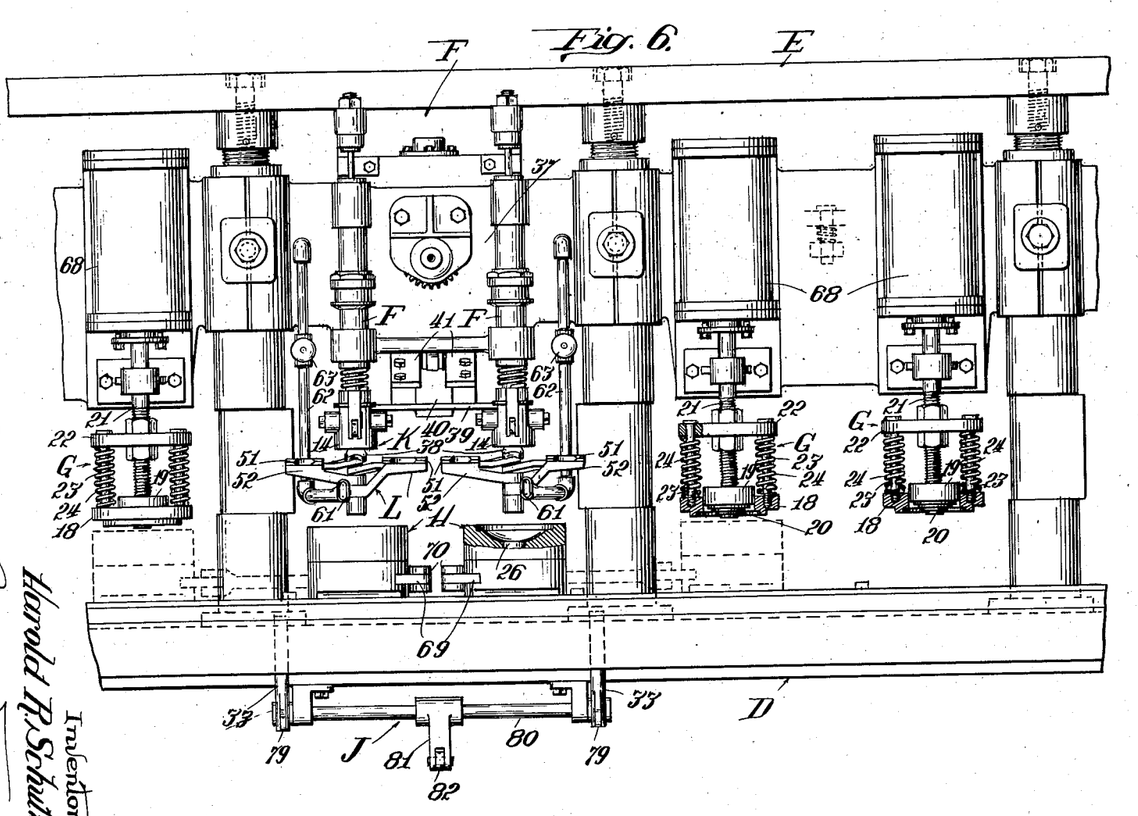
Fig. 6 is an elevation showing a group of the units disposed about the circumference of the rotary frame, this view being taken looking from the left at the structure shown in Fig. 2, but illustrating the units as developed or disposed in the plane of the drawing, whereas they are actually disposed in a curved path around the circumference of the rotary frame, as suggested in Figs. 3 and 5.

In order to reheat and control the temperatures of the suspended glass blanks, burners 61 are positioned so as to project their flames against the suspended blanks as shown in Figs. 2 and 6. These burners are carried at the lower end of pipes 62 provided with valves 63 to control the flow of gas or other heating medium to the burners. The pipes 62 communicate with a chamber 64 formed in the rotating frame E which communicates through port 65 with the chamber 66 in the relatively stationary frame D. A similar set of communicating chambers indicated at 67 is used for supplying compressed air to the rotating mechanisms.

The pressing devices G and the pressing molds H have already been described somewhat in detail in connection with the description of Figs. 14 to 16 inclusive. A pair of the pressing devices G is positioned between each set of spindles F about the circumference of rotary frame E, and the plunger stem 21 of each pressing device G is connected with the piston of a fluid pressure cylinder 68 of adequate size to perform the pressing operation. The flow of fluid under pressure to each cylinder 68 is regulated in properly timed relation to the rotation of frame or carriage E by means of suitable cooperating cam mechanisms carried by the relatively movable frames E and D, respectively.

Figure 3:
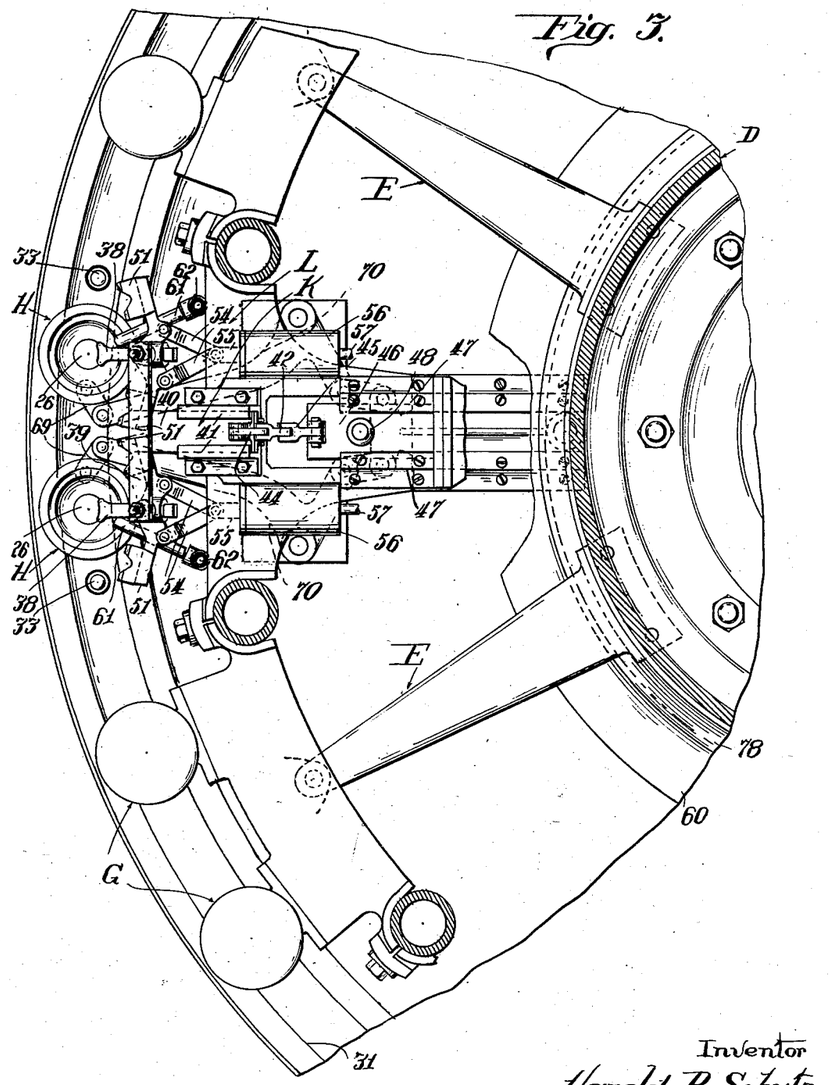
Fig. 3 is a partial horizontal section, taken substantially on the line 3—3 of Fig. 2.
Figure 4:
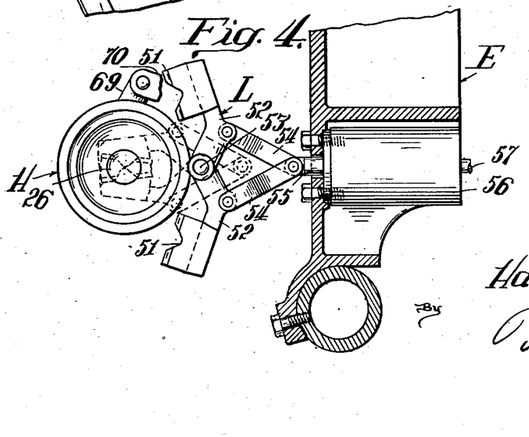
Fig. 4 is a partial horizontal section, taken substantially on the line 4—4 of Fig. 2.
Figure 5:
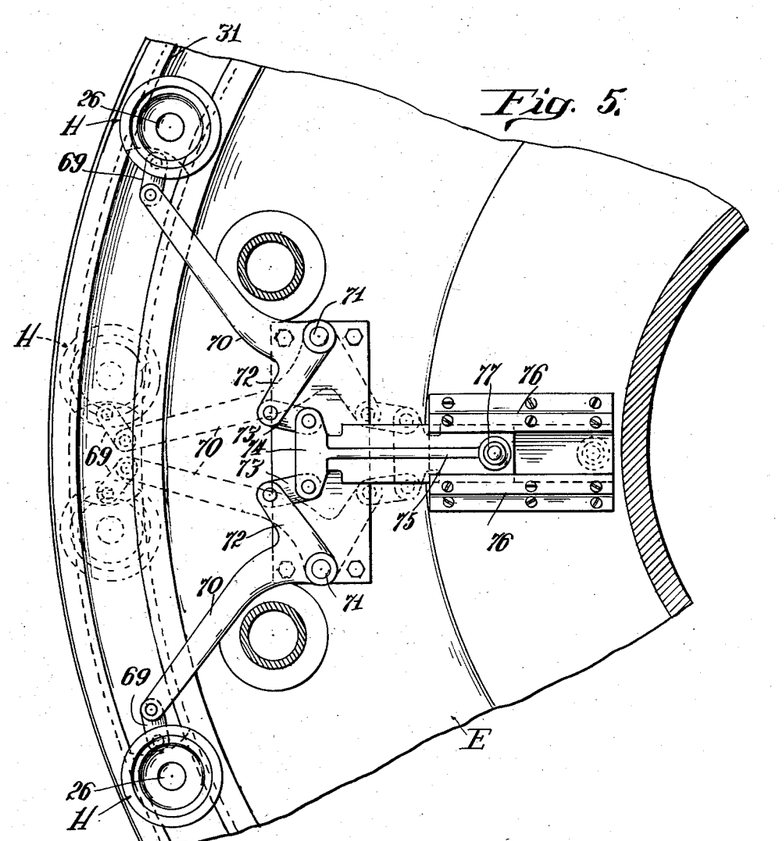
Fig. 5 is a partial horizontal section taken substantially on the line 5—5 of Fig. 2.

Each pressing mold H is connected by means of a link 69 with the end of the longer arm 70 of a bellcrank lever pivoted at 71, the shorter arm 72 of the bellcrank being connected through link 73 with the head 74 at the outer end of a slide 75 movable in fixed slideway 76 on carriage E. A roller 77 on this slide moves in a fixed cam slot 78 carried by the fixed frame D. It will be noted that when the slide 75 is pulled in toward the central axis of the machine (as shown in Figs. 1, 2 and 3) the molds H will be positioned beneath the pair of spindles F. When the slide 75 is pushed outwardly the molds H will be swung in opposite direction so as to be positioned beneath the adjacent pressing devices G at either side of the spindle assembly (see Fig. 5). It might be here noted that the two pressing devices G of each pair positioned between the spindle assemblies do not operate as a unit or simultaneously, but each pressing device G of the pair cooperates with the adjacent spindle. In other words, the pair of pressing devices G which cooperate with one pair of spindles is positioned one at either side of the spindle assembly.

The ejector mechanism J is best shown in Figs. 2 and 6. The plungers 33 for one pair of molds H are connected through crank arms 79 with a rock-shaft 80 which is connected through crank arm 81 and link 82 with a slide 83 movable in slideway 84 and carrying a roller 85 which travels in the cam slot 86 carried by fixed frame D. The shape of the cam slot is such that at the proper time the plungers 33 will be elevated to cooperate with the plungers 27 in the respective molds and eject the finished pressed articles 25.

In the general operation of this machine it is to be understood that the carriage E, about the circumference of which are mounted the several individual groups of spindles and pressing mechanism, rotates continuously and steadily but at a rather slow speed, whereas the single ram C operates more rapidly so as to deliver a pair of glass blanks to each pair of spindles F as these spindles successively arrive at the receiving station beneath the ram. The cooperating cam devices on the movable carriage E and fixed supporting frame D are so adjusted that the operations of the several devices will take place successively and at proper intervals as the units rotate through 360° with the carriage E. The pair of spindles F (of each unit) after receiving the blanks are first inverted and each is continuously rotated about its longitudinal axis. The necking tools 38 are then projected against the blanks. After these necking tools are withdrawn the shears L are operated to cut off the blanks and permit the charges to drop into the pressing molds H. These molds are then shifted into position beneath the adjacent pressing devices G which devices are then depressed to press the lenses or other articles to shape. In the meantime the unused portions 17 of the original blanks are discharged from the spindles (as shown in Fig. 14), and the spindles are again inverted or returned to their upright positions so that they will be in position to receive another set of blanks at the completion of the 360° path of travel. After the pressing operation is completed and the molds H have been shifted from beneath the pressing devices G, the ejecting mechanism J is operated to push out the finished articles 25. This cycle of events is repeated throughout each rotation of the carriage E. It is to be understood that the same set of fixed cams on the fixed frame D can operate all of the similar units carried by the rotating carriage E, since the same operation is performed by each of these devices as it reaches a certain position in the circular path of travel of the carriage.

It will be understood that the essential difference between the process herein disclosed and the one disclosed in the prior patent to Kadow 1,264,085 hereinabove referred to is that the original blank is inverted before being dropped into the pressing mold so that there will be no seams or cut-off scars on the lower portion of the blank which comes in contact with the mold. In order to accomplish this inversion, the blank is first transferred to a device which grips the original lower scarred portion of the blank and inverts the blank so that it is suspended from above, after which the blank is again cut off so that the cut portion will be uppermost when the blank is dropped into the pressing mold. While the mechanisms used for gathering the blanks and inverting the same may be essentially like those heretofore used in blowing machines, these parts may be considerably simplified, especially the "spindles" or equivalent devices for holding and inverting the blanks. New mechanism has been provided to cooperate with these inverted blanks so as to reheat, form, cut-off and press the blanks. Practically the entire operation is automatic and the machine, when properly adjusted, requires little attention.

I claim:

1. The process of pressing glass articles consisting in gathering a charge of glass by suction, cutting off surplus glass from the lower portion of the charge, supporting the lower portion of the charge and inverting it end for end so that it is suspended from above, cutting off the charge below the supported portion, dropping the cut off portion into a mold and pressing the charge to shape.

2. The process of pressing glass articles consisting in gathering a charge of glass by suction, cutting off surplus glass from the lower portion of the charge, supporting the lower portion of the charge and inverting it end for end so that it is suspended from above, reheating and reforming the suspended charge below the suspending means, cutting off the charge, dropping the cut off portion into a mold and pressing the charge to shape.

3. In a process of pressing glass articles, the method of feeding glass charges to a pressing mold consisting in gathering a glass charge by suction, cutting off surplus glass below the charge, supporting the lower portion of the charge and inverting the charge so that it is suspended from above, and cutting off the inverted charge below the supported portion and dropping this cut off portion into the mold.

4. In a process of pressing glass articles, the method of feeding glass charges to a pressing mold consisting in gathering a glass charge by suction, cutting off surplus glass below the charge, supporting the lower portion of the charge, inverting the charge so that it is suspended from above, reheating and reforming the suspended charge, and cutting off the inverted charge below the supported portion and dropping the cut off portion into the mold.

5. In a process of pressing glass articles, the method of feeding glass charges to a pressing mold consisting in gathering a glass charge by suction, cutting off surplus glass below the charge, supporting the lower portion of the charge, inverting the charge so that it is suspended from above and rotating the suspended charge about its central vertical axis, reheating and necking in the charge below the supporting means, and cutting off the charge where necked in and dropping the cut off portion into the mold.

6. Apparatus for pressing glass article comprising a pressing mold, pressing means, a gathering ram comprising a gathering mold, means for sucking a charge of glass into the gathering mold, a cut off device for removing surplus glass from the bottom of the charge, a means for supporting the lower end of the charge when released from the gathering mold and inverting the charge end for end so that it is suspended from above, and a shearing device for cutting off the charge below the supporting means and dropping the cut off portion into the pressing mold.

7. Apparatus for pressing glass articles comprising a pressing mold, pressing means, a gathering ram comprising a gathering mold, means for sucking a charge of glass into the gathering mold, a cut off device for removing surplus glass from the bottom of the charge, a spindle, means for rotating the spindle about its central vertical axis, means for inverting the spindle end for end, means at one end of the spindle for gripping the lower portion of the charge when released from the gathering mold and for suspending the charge from above when the spindle is inverted, means for reheating and reforming the inverted charge, and a shearing device for cutting off the suspended charge below the spindle and dropping the cut off portion into the pressing mold.

8. Apparatus for pressing glass articles comprising a pressing mold, pressing means, a gathering ram comprising a gathering mold, means for sucking a charge of glass into the gathering mold, a cut off device for removing surplus glass from the bottom of the charge, a spindle, means for rotating the spindle about its central vertical axis, means for inverting the spindle end for end, means at one end of the spindle for gripping the lower portion of the charge when released from the gathering mold and for suspending the charge from above when the spindle is inverted, means for reheating the charge, means for necking in the suspended and rotating charge, and a shearing device for cutting off the charge where necked in and dropping the lower portion into the pressing mold.

9. Apparatus for pressing glass articles comprising a pair of spindles, means at the lower end of each spindle for suspending a glass blank, a pair of pressing devices one positioned at each side of the pair of spindles, a pair of pressing molds, means for moving the molds in opposite directions from positions beneath the spindles to positions beneath the pressing devices, means for reheating and reforming the suspended blanks, and means for cutting off the blanks so that the cut off portions will drop into the molds.

10. Apparatus for pressing glass articles comprising a rotatable frame, a plurality of pairs of spindles positioned at spaced intervals on the rotary frame, means at one end of each spindle for gripping and supporting one end portion of a glass blank, means for rotating each spindle about its longitudinal axis and for inverting the spindle end for end, a gathering ram including a pair of suction molds for simultaneously gathering a pair of glass blanks and for depositing these blanks in the gripping means of a pair of spindles, a plurality of pairs of vertically movable pressing devices positioned on the frame in the spaces between the pairs of spindles, a plurality of pairs of pressing molds, means for moving the molds from positions beneath the inverted spindles to positions beneath the pressing devices, and means for cutting off the blanks when suspended from the inverted spindles so that the cut off portions will drop into the pressing molds.

11. Apparatus for pressing glass articles comprising a rotatable frame, a plurality of pairs of spindles positioned at spaced intervals on the rotary frame, means at one end of each spindle for gripping and supporting one end portion of a glass blank, means for rotating each spindle about its longitudinal axis and for inverting the spindle end for end, a gathering ram including a pair of suction molds for simultaneously gathering a pair of glass blanks and for depositing these blanks in the gripping means of a pair of spindles, a plurality of pairs of vertically movable pressing devices positioned on the frame in the spaces between the pairs of spindles, a plurality of pairs of pressing molds, means for moving the molds of each pair in opposite directions from positions beneath the inverted spindles to positions beneath the adjacent pressing devices at either side of the pair of spindles, and means for cutting off the blanks when suspended from the inverted spindles so that the cut off portions will drop into the pressing molds.

12. Apparatus for pressing glass articles comprising a rotatable frame, a plurality of pairs of spindles positioned at spaced intervals on the rotary frame, means at one end of each spindle for gripping and supporting one end portion of a glass blank, means for rotating each spindle about its longitudinal axis and for inverting the spindle end for end, a gathering ram including a pair of suction molds for simultaneously gathering a pair of glass blanks and for depositing these blanks in the gripping means of a pair of spindles, a plurality of pairs of vertically movable pressing devices positioned on the frame in the spaces between the pairs of spindles, a plurality of pairs of pressing molds, means for moving the molds of each pair in opposite directions from positions beneath the inverted spindles to positions beneath the adjacent pressing devices at either side of the pair of spindles, means for reheating and necking in the rotating blanks when suspended from the inverted spindles, and means for cutting off the necked in blanks so that the cut off portions will drop into the pressing molds.

13. Apparatus for pressing glass articles comprising a rotatable frame, a plurality of pairs of spindles positioned at spaced intervals on the rotary frame, means at one end of each spindle for gripping and supporting one end portion of a glass blank, means for rotating each spindle about its longitudinal axis and for inverting the spindle end for end, a gathering ram including a pair of suction molds for simultaneously gathering a pair of glass blanks, means for cutting off the surplus glass, and means for depositing these blanks in the gripping means of a pair of spindles, a plurality of pairs of vertically movable pressing devices positioned on the frame in the spaces between the pairs of spindles, a plurality of pairs of pressing molds, means for moving the molds from positions beneath the inverted spindles to positions beneath the pressing devices, and means for cutting off the blanks when suspended from the inverted spindles so that the cut off portions will drop into the pressing molds.

14. Apparatus for pressing glass articles comprising a rotatable frame, a plurality of pairs of spindles positioned at spaced intervals on the rotary frame, means at one end of each spindle for gripping and supporting one end portion of a glass blank, means for rotating each spindle about its longitudinal axis and for inverting the spindle end for end, a gathering ram including a pair of suction molds for simultaneously gathering a pair of glass blanks, means for cutting off the surplus glass, and means for depositing these blanks in the gripping means of a pair of spindles, a plurality of pairs of vertically movable pressing devices positioned on the frame in the spaces between the pairs of spindles, a plurality of pairs of pressing molds, means for moving the molds of each pair in opposite directions from positions beneath the inverted spindles to positions beneath the adjacent pressing devices at either side of the pair of spindles, and means for cutting off the blanks when suspended from the inverted spindles so that the cut off portions will drop into the pressing molds.

HAROLD R. SCHUTZ.